(12) United States Patent
Niver et al.

(10) Patent No.: US 7,631,143 B1
(45) Date of Patent: Dec. 8, 2009

(54) DATA STORAGE SYSTEM EMPLOYING VIRTUAL DISK ENCLOSURE

(75) Inventors: Brett Niver, Grafton, MA (US); Steven T. McClure, Northboro, MA (US); Steven R. Chalmer, Auburndale, MA (US); David L. Scheffey, Medway, MA (US); Kevin E. Granlund, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 261 days.

(21) Appl. No.: 11/325,228

(22) Filed: Jan. 3, 2006

(51) Int. Cl.
*G06F 12/16* (2006.01)
(52) U.S. Cl. .............................. 711/114; 711/118; 714/5
(58) Field of Classification Search ........................ None
See application file for complete search history.

(56) References Cited

U.S. PATENT DOCUMENTS

| | | | |
|---|---|---|---|
| 6,412,079 B1 * | 6/2002 | Edmonds et al. ............... 714/11 |
| 6,516,390 B1 * | 2/2003 | Chilton et al. ............... 711/138 |
| 6,549,979 B1 * | 4/2003 | Linnell ........................ 711/114 |
| 6,757,774 B1 * | 6/2004 | Benson et al. ............... 710/305 |
| 6,795,885 B1 * | 9/2004 | deBlanc et al. ............. 710/305 |
| 6,973,537 B1 | 12/2005 | Kowalchik et al. |
| 7,174,422 B1 | 2/2007 | Kowalchik et al. |
| 2002/0124139 A1 * | 9/2002 | Baek et al. ................... 711/114 |
| 2003/0131182 A1 * | 7/2003 | Kumar et al. .................. 711/5 |
| 2004/0059958 A1 * | 3/2004 | Umberger et al. ............... 714/5 |
| 2004/0064638 A1 * | 4/2004 | Chong, Jr. .................... 711/114 |
| 2006/0101203 A1 * | 5/2006 | Yanagisawa ................. 711/114 |

* cited by examiner

*Primary Examiner*—Matt Kim
*Assistant Examiner*—Kaushikkumar Patel
(74) *Attorney, Agent, or Firm*—BainwoodHuang (57) ABSTRACT

A data storage system employs a virtual disk enclosure that utilizes a number of physical disk drives to create a set of virtual disk drives that are visible to the remainder of the storage system. The virtual disk drives exhibit a set of characteristics such as respective storage capacities, access times, and reliability measures that are user-selectable within respective limits determined by the set of corresponding physical disk drive characteristics. For example, a RAID protection scheme can be used such that the overall storage capacity of the virtual disk drives is less than that of the physical disk drives, but has greater overall reliability/availability. The system may utilize a recursive protection scheme in which the virtual disk drives are utilized according to a second RAID configuration to provide a set of highly available logical storage volumes to host computer systems connected to the data storage system. The virtual disk enclosure preferably includes redundant components for enhanced system availability.

6 Claims, 6 Drawing Sheets

DATA STORAGE SYSTEM EMPLOYING VIRTUAL DISK ENCLOSURE

BACKGROUND

The invention is related to the field of data storage systems.

Many modern computing installations utilize large, sophisticated data storage systems having a desired degree of overall size or capacity, reliability/availability, and performance. Examples of such large data storage systems include those used in connection with large corporate databases or large public or private web sites. These storage systems employ an array of relatively independent individual disk drives along with data communications devices and interconnections to provide desired data accessibility. The number of individual disk drives may be in the range of tens to hundreds, collectively providing many gigabytes or terabytes of storage capacity.

It is known to provide redundancy in data storage systems to protect user data from loss upon failure of disk drives or other storage system components. One general class of data protection schemes is referred to by the acronym RAID, which stands for "redundant array of independent disks". Different forms of RAID provide data protection in different ways. In one form, data is replicated or "mirrored", and upon failure of a primary device, data is obtained from a mirror device. Other forms of RAID employ redundancy in the form of parity that is stored in association with data. When all or part of a disk drive fails, the data that was stored on the disk drive is re-created from related data and parity information. Data loss is avoided in a fairly storage-efficient manner.

SUMMARY

There is a continuing trend for larger storage capacities in data storage systems, driven by continuing increases in the use of computers and in particular increasing demand for data storage capacity in computer systems. It has been estimated, for example, that many storage systems experience demand growth on the order of 100% (doubling) per year.

Among the challenges of this increasing demand is that of simply keeping a given large storage system running properly. As the number of individual physical disk drives in a storage system grows, so does the frequency with which failed disk drives need to be replaced. This is not so much due to any diminishing reliability of the disk drives themselves, as it is to the sheer number of disk drives in a system. Even if the individual disk drives have long mean-time-to-failures (MTTFs), the overall disk drive replacement rate grows as the number of disk drives in a system grows. When RAID or other forms of data protection are used, the failure of a single drive does not result in the loss of user data, but until a failed drive is replaced the data is either unprotected or must be moved somehow to another set of disk drive. In modern systems it is common for a disk drive failure to result in an emergency service call to the storage system maintenance organization. In the extreme, it may be required to dedicate a significant fraction of a maintenance person's time to simply responding to such emergency calls for a single large storage system.

In accordance with the present invention, a storage system and method are disclosed in which greater reliability/availability can be achieved through use of a "virtual disk" abstraction. The physical disk drives of a storage system can be configured in a flexible manner to achieve a desired mix of capacity, performance and reliability/availability. In particular, when used with emerging enhanced data protection schemes, the disclosed techniques can help to regularize the replacement of failed disk drives in large data storage systems, reducing the need for emergency service calls and the associated costs.

A disclosed virtual disk enclosure includes a physical interface at which data storage requests from external requestors are received, and a number of physical disk drives exhibiting a set of physical disk drive characteristics including respective storage capacities, access times, and reliability measures. A controller coupled between the physical interface and the physical disk drives utilizes the physical disk drives to implement a set of virtual disk drives providing data storage functionality to the external requestors via the physical interface. The virtual disk drives exhibit a set of virtual disk drive characteristics including respective storage capacities, access times, and reliability measures that are user-selectable within respective limits determined by the set of physical disk drive characteristics. As an example, the virtual disk enclosure may present six virtual disk drives to the external requestors, the six virtual disk drives being implemented using a set of eight physical disk drives and some form of RAID protection scheme. In such a case, the overall storage capacity of the six virtual disk drives is less than that of the eight physical disk drives, but the overall reliability/availability is greater by virtue of the RAID protection scheme. Other virtualizing configurations of an individual virtual disk enclosure are possible. The virtual disk enclosure may be used in a standalone fashion (i.e., coupled directly to a host computer for which it provides data storage) or along with other such enclosures as part of a larger data storage system.

In another aspect, a data storage system is disclosed that has a number of physical disk drives having respective reliability measures. A first controller is coupled to the physical disk drives and utilizes them to implement a set of virtual disk drives in a first redundant-array-of-independent-disks (RAID) configuration, such that each virtual disk drive has a reliability measure greater than the respective reliability measures of the physical disk drives. A second controller is coupled to the first controller and utilizes the virtual disk drives to implement a set of storage volumes in a second RAID configuration such that each storage volume has a reliability measure greater than the respective reliability measures of the virtual disk drives. This recursive protection scheme can provide sufficiently improved reliability/availability such that the level of emergency service calls for even very large storage systems can be significantly reduced.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
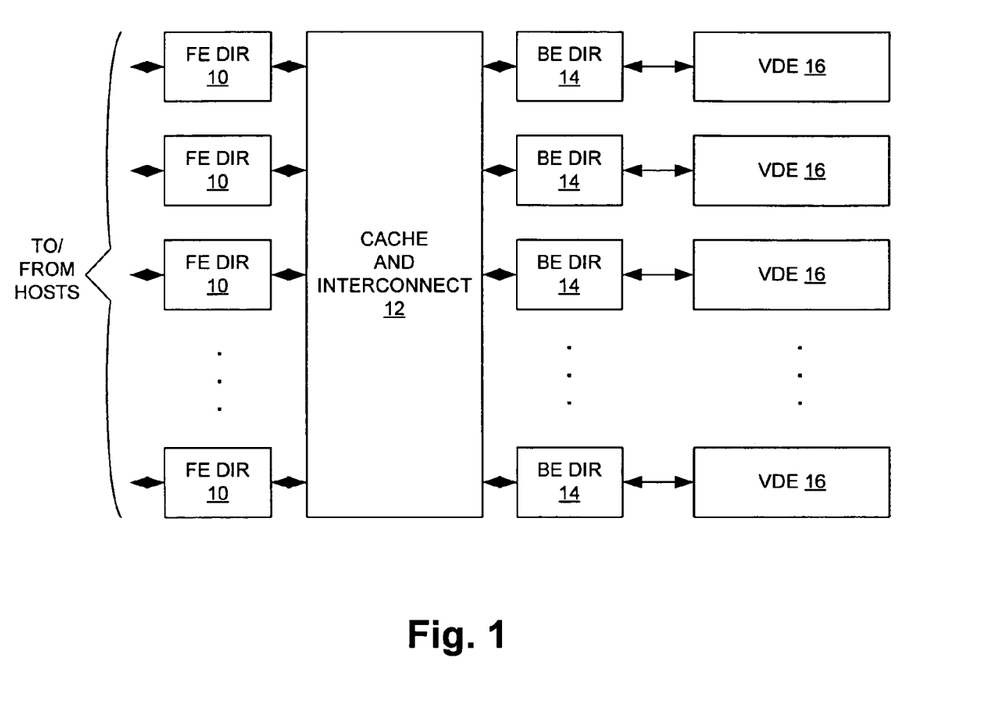
FIG. 1 is a block diagram of a data storage system in accordance with the present invention.

FIG. 1 shows a storage system having a plurality of controllers referred to as "front-end directors" (FE DIR) 10 providing interfaces to host computers (not shown). The FE DIRs 10 connect to a cache and interconnect block 12, which in turn is coupled to a plurality of controllers referred to as "back-end directors" (BE DIR) 14. Each BE DIR 14 provides an interface to a respective virtual disk enclosure (VDE) 16. As described in more detail below, each VDE 16 includes a number of disk drives along with redundant controllers and power supplies to provide a highly reliable and configurable set of storage resources.

In operation, storage requests from the hosts are received by the FE DIRs 10. The requests are generally serviced from a large cache memory (cache) residing within the cache and interconnect block 12. Read requests may experience delay in servicing due to cache "misses", i.e., the need to obtain the requested data from a VDE 16 because the data is not presently residing in the cache. Write requests can be processed according to a desired policy such as write-back, write-through, etc. as generally known in the art.

The storage system provides storage resources to the host computers in the form of "logical volumes", which are generally large storage units that are visible to the host operating system. The logical volumes are stored on the physical disk drives within the VDEs 16 in a manner described in more detail below. Part of the function of the storage system is to isolate the host operating system from the underlying physical realization of the logical volumes. This isolation enables the storage system to provide a robust and flexible set of storage-related services to the host computers without burdening the host computers with the underlying details of such services. An example includes the caching that occurs via the cache in the cache and interconnect block 12. Other examples include fault-tolerance functionality such as data mirroring and RAID.

Figure 2:
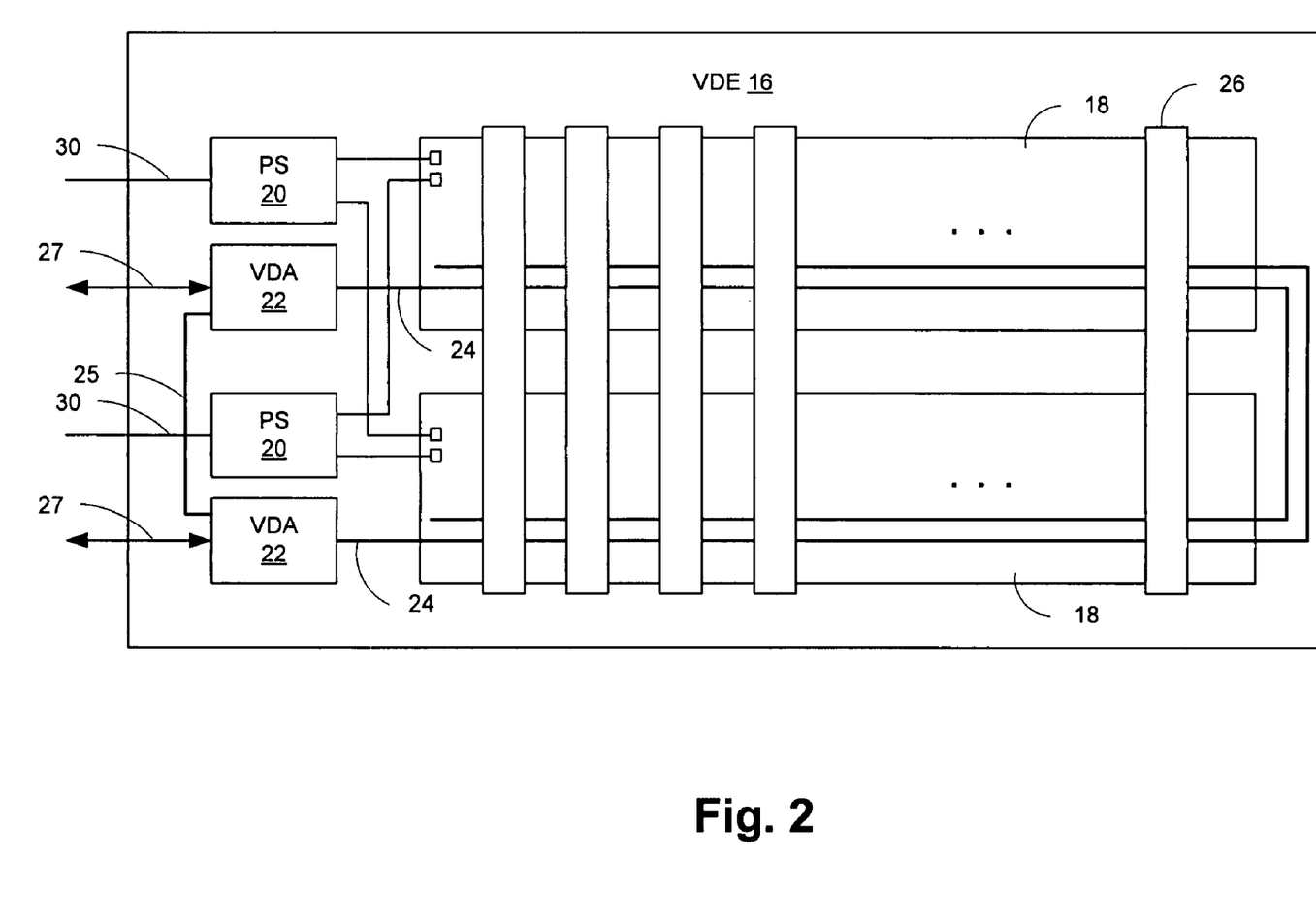
FIG. 2 is a block diagram of a virtual disk enclosure in the data storage system of FIG. 1.

FIG. 2 shows the structure of a VDE 16. The VDE 16 includes a pair of backplanes 18, each including a respective set of slots or connectors. The VDE 16 also includes a pair of power supplies (PS) 20, each connected to both of the backplanes 18 in a redundant manner. The VDE 16 also includes a pair of controllers referred to as virtual disk adapters (VDA) 22 connected to the backplanes 18. Specifically, each VDA 22 is connected to both of the backplanes 18 by a respective high-speed data bus 24 as shown. The two VDAs 22 are also connected to each other by a separate high-speed data bus referred to as an "inter-VDA bus" 25. External buses 27, which may be for example optical Fibre Channel buses, provide interfaces to external requestors (e.g. the BE DIRs 14). A set of disk drive modules 26 connects to both the backplanes 18, obtaining redundant power connections as well as redundant data connections via the buses 24. Each disk drive module 26 is a sealed unit including a high-capacity fixed disk drive and associated mechanical and electrical components. The number of disk drive modules 26 in any given implementation is a function of a number of factors, including respective budgets for cost, space and power. In one embodiment, the backplanes 18 have 16 slots for accepting up to 16 disk drive modules 26. Overall, the VDE 16 presents two data interfaces 27 and two power connections 30 to the rest of the storage system.

In the VDE 16 illustrated in FIG. 2, it is generally desirable to partition the disk drive modules 26 into two groups, each being associated with a corresponding backplane 18, PS 20, and VDA 22 for primary operation. In addition to providing the primary operation for its group, each backplane 18, PS 20 and VDA 22 serves as a back-up to the corresponding other backplane 18, PS 20 and VDA 22 in the event of failure. With respect to the PSs 20 and backplanes 18, the detection of failures and a switchover can occur automatically within the VDE 16. That is, detection circuitry can detect the failure of the PS 20 for a given backplane 18 and automatically route power from the working PS 20 to that backplane 18. Each PS 20 can provide for the full need of the VDE 16 by itself. In a similar way, the VDAs 22 can detect failures of a backplane 18 and automatically route communications via the other backplane 18. With respect to the VDAs 22, the external devices connected to the external buses 27 must co-operate in the redundancy scheme, such that requests that would normally be sent to the failed VDA 22 are sent to the working VDA 22 instead. Either VDA 22 can handle all of the virtual and physical devices, although at potentially a reduced performance.

Due to the extensive redundancy within the VDE 16 as shown in FIG. 2, it is possible for the VDE 16 to continue operation despite the loss of any single component such as a PS 20, a VDA 22 or even an entire backplane 18. Overall performance may be reduced during the time that a component is non-operative (including the replacement procedure). A power-down may be required for servicing a failed backplane 18. Redundancy of the data storage among the disk drive modules 26 is described below.

Figure 3:
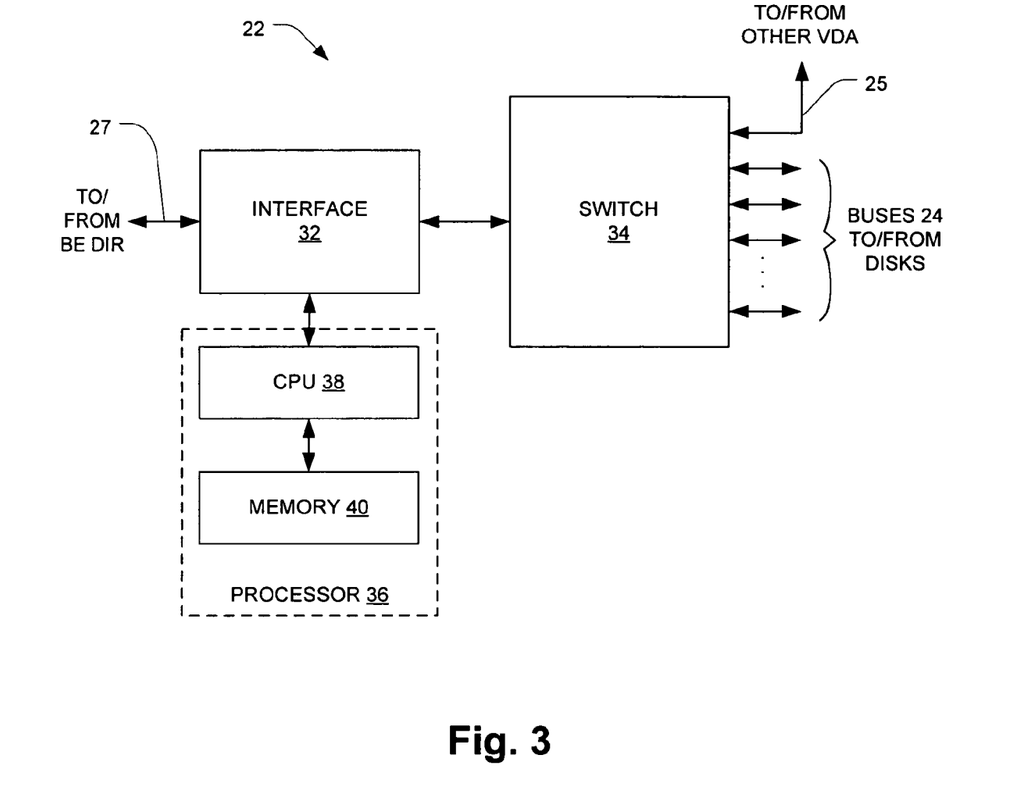
FIG. 3 is a block diagram of a virtual disk adapter in the virtual disk enclosure of FIG. 2.

FIG. 3 illustrates the hardware structure of a VDA 22. An interface block 32 provides the data interface to the rest of the storage system, specifically to a respective BE DIR 14 of FIG. 1. The interface block 32 is coupled to a multi-port switch 34 which has a port connected to the inter-VDA bus 25 and ports connected to the buses 24 to the backplanes 18. The interface block 32 also has a connection to a processor 36 which includes a processing unit (CPU) 38 and memory 40. The processor 36 is responsible for a variety of tasks on the VDA 22, including management and operation of redundant array of independent disks (RAID) groups as described in more detail below.

Returning again to FIG. 2, the combination of the VDAs 22 and the physical disk drives within the disk drive modules 16 are utilized to present a set of "virtual" disk drives to the rest of the storage system via the external buses 27. The virtual disk drives have the appearance of real, physical disk drives from the perspective of the rest of the storage system. The provisioning of storage is virtual—each VDE 16 can appear to be any amount of storage up to the physical limit of the physical disk drives it houses in its disk drive modules 26, divided among a configurable number of virtual disk drives. This flexible configurability enables trade-offs to be made in multiple ways, including the following:

Data integrity (protection) versus performance (capacity, latency)

Latency versus capacity

Reliability (virtual versus physical provisioning)

Each VDE 16 has internal configuration policies, including a set of default policies. As an example of a default configuration policy, each VDE 16 may be internally configured as two RAID 6+2 groups, one group under the primary control of one of the VDAs 22 and the other group under the primary control of the other VDA 22 of the VDE 16. As is known in the art, RAID 6+2 is a form of redundancy utilizing two independent parity groups for multi-block sets of data, as well as striping of the parity groups across different physical disks. If there are 16 disk drive modules 26 in a given VDE 16, for example, it can be configured into two groups of 8 disk drives each, with each 8-drive group implementing RAID 6+2 protection. Other default configurations are possible depending on the target application(s) for the storage system. Examples of different configurations are given below with reference to FIGS. 4-6.

Preferably the configuration policies and other policies can be modified by management software executing within the storage system. It may be beneficial to use an "in-band" configuration method, i.e., one that employs a private virtual drive dedicated for management of the VDE 16. In-band configuration enables a VDE 16 to be a transparent replacement for existing disk enclosures. A field upgrade or reconfiguration can be realized by writing to the private virtual drive (with the appropriate system-level protections etc.). This method can be used to reconfigure a VDE 16, reprogram a VDA 22, etc. The configuration data can be generated off-line and/or external to the host computer and then written to the VDE 16 in a manner that is transparent to the host operating system and existing host applications.

Although it would be possible to utilize substantially all of the physical storage capacity of the disk drive modules 26 for user data, one of the great benefits of the disk virtualization described herein is the ability to trade storage capacity for improved reliability/availability by employing some form of redundancy. The RAID 6+2 configuration described above is a good example. In a RAID 6+2 configuration, the capacity for storing user data is approximately ¾ of the total raw disk capacity. In exchange for this reduced capacity, the reliability/availability of the virtual disk drives presented by a VDE 16 can be much higher than the reliability/availability of the whole set of disk drives within the VDE 16. Reliability/availability can be represented by any of a variety of reliability measures, such as for example mean time to failure (MTTF). As an example, a configuration of RAID 6+2 can be shown to have a MTTF of 5.5E+10, and a RAID 7+1 configuration a MTTF of 59E+7, so any number of policies could be defined to make the proposed tradeoffs. A RAID 6+2 group can tolerate the simultaneous failure of two physical disk drives without data loss, and the failure of a single physical disk drive with little decrease in overall reliability of the group and little or no performance loss. Thus, the failure of a single physical disk drive need not trigger an immediate (and expensive) service call—failed drives can be replaced in a less-expensive "batch" manner during more routine maintenance operations.

Other internal configuration options are possible. It may be desirable, for example, to realize a form of tiered storage by populating a VDE 16 with a set of very high density physical disk drives and a separate set of low-latency physical disk drives. Provisioning policies can be utilized to tune performance over a broad range while preserving a desired level of reliability. For example, the overall storage capacity as seen from the rest of the storage system might be limited to the overall capacity of only the high-density physical disk drives, while the low-latency drives are used as caches to improve performance. Alternatively, it may be desirable to use both sets of drives for user data, providing both high-performance and lower-performance storage services from a single VDE 16.

Other configuration policies can be utilized in conjunction with write operations. For example, it may be desirable to have a default policy that writes are acknowledged only when the data has been successfully written to a physical disk drive. An alternative policy is to provide write acknowledgments immediately, before completing the write to a physical disk drive. This policy might be useful in applications that require very high performance and that can tolerate somewhat reduced write reliability. Reliability may be enhanced for some class(es) of data by using the inter-VDA bus 25 to mirror the write data to the other VDA 22. Depending on the amount of bandwidth available on the inter-VDA bus 25, such write mirroring or other cross-group functionality may be provided as a quality-of-service option with its own incremental cost to the user, rather than as a generally available option.

Figure 4:
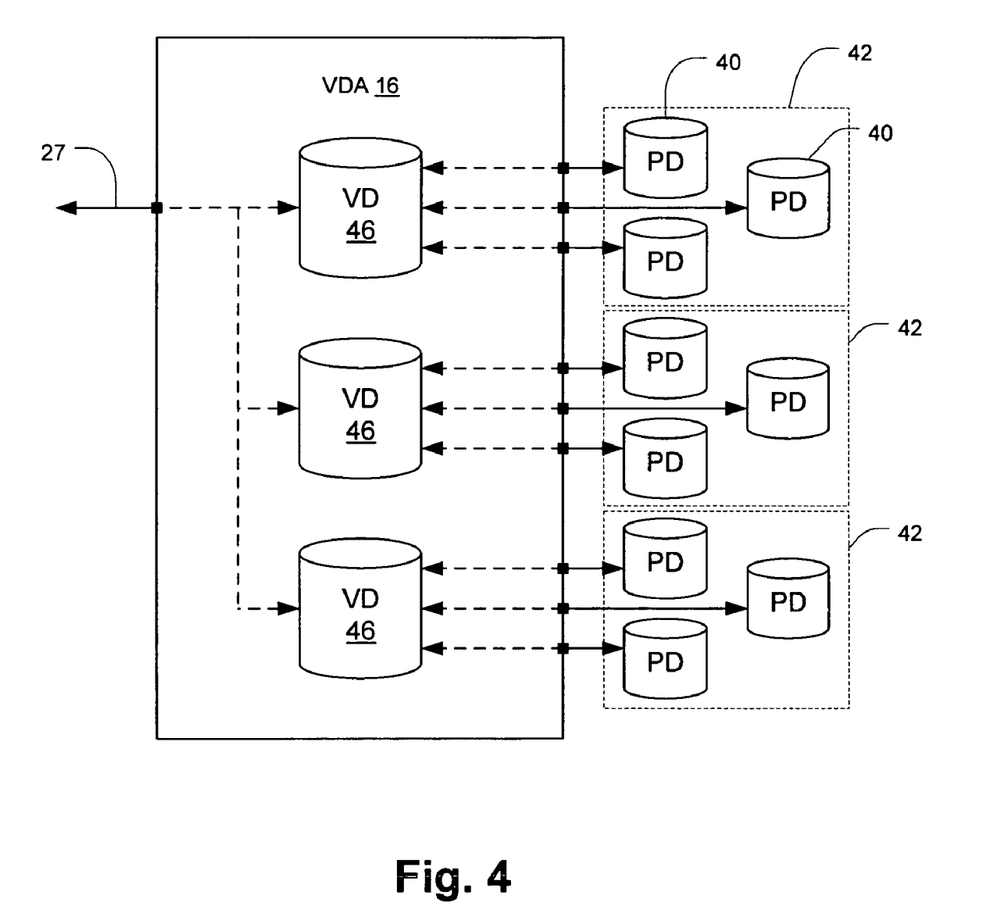
FIGS. 4-6 are schematic diagrams of a respective exemplary configurations providing respective sets of virtual disks

FIG. 4 shows a first example configuration for a group having 9 physical disk drives (PD) 40. The PDs 40 are partitioned into three sets 42 of three PDs 40 each. The PDs 40 of each set 42 are used to implement a corresponding one of three virtual disk drives (VD) 46. The VDs 46 have respective software connections to the external bus 27. Each VD 46 may be realized in any of a variety of ways. In one example, each VD 46 may be simply a disk drive having three times the capacity of one of the PDs 40. As an alternative, some type of data protection scheme might be employed such that the VD 46 has less than maximum capacity but better reliability/availability.

Figure 5:
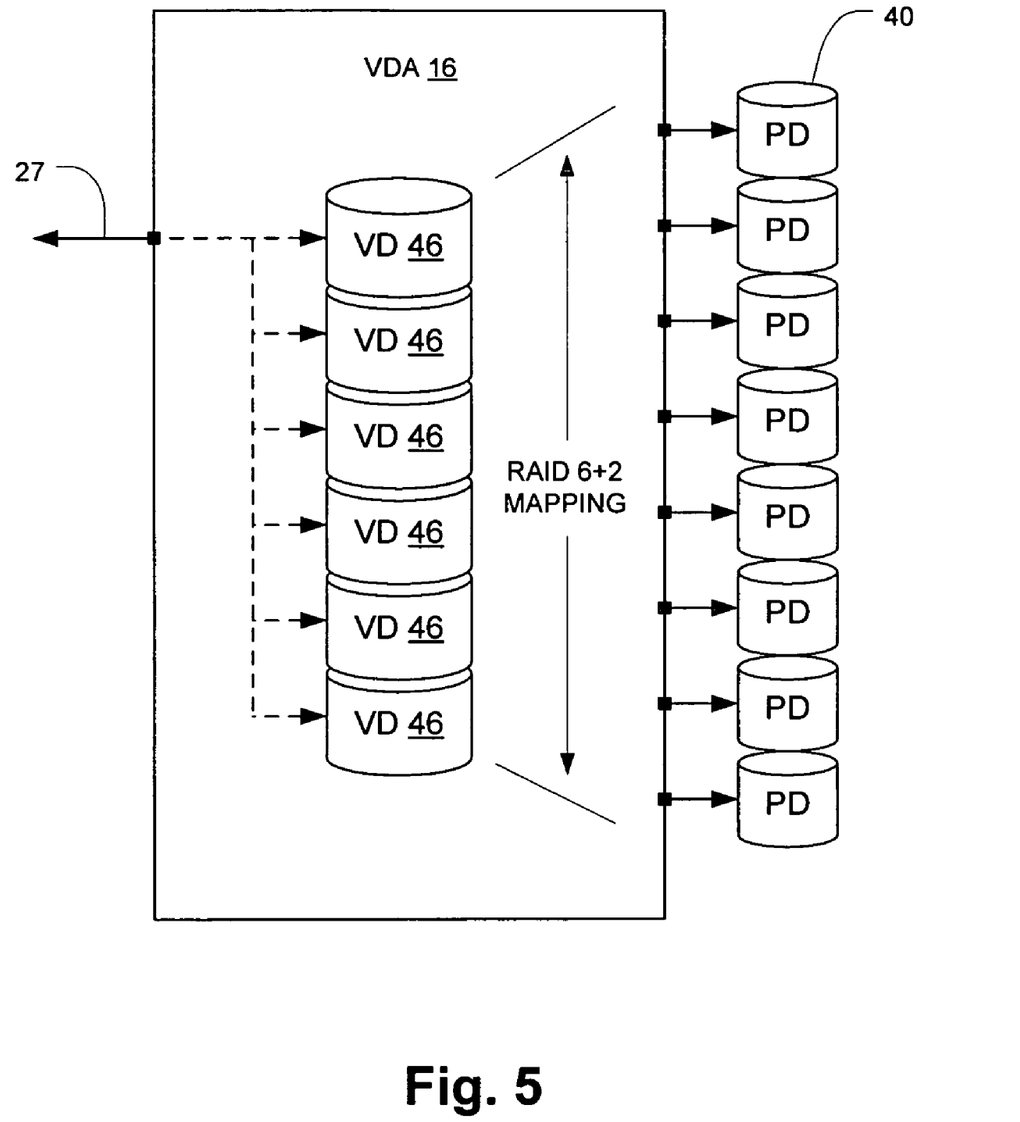

FIG. 5 shows another example, which is the RAID 6+2 configuration discussed above. A set of eight PDs 40 is used to implement a set of six VDs 46, each having a capacity equal to one of the PDs 40. The VDA 16 implements the RAID 6+2 mapping of the volumes of the VDs 46 to corresponding sets of blocks of the PDs 40, along with the software connectivity between the VDs 46 and the external bus 27.

Figure 6:
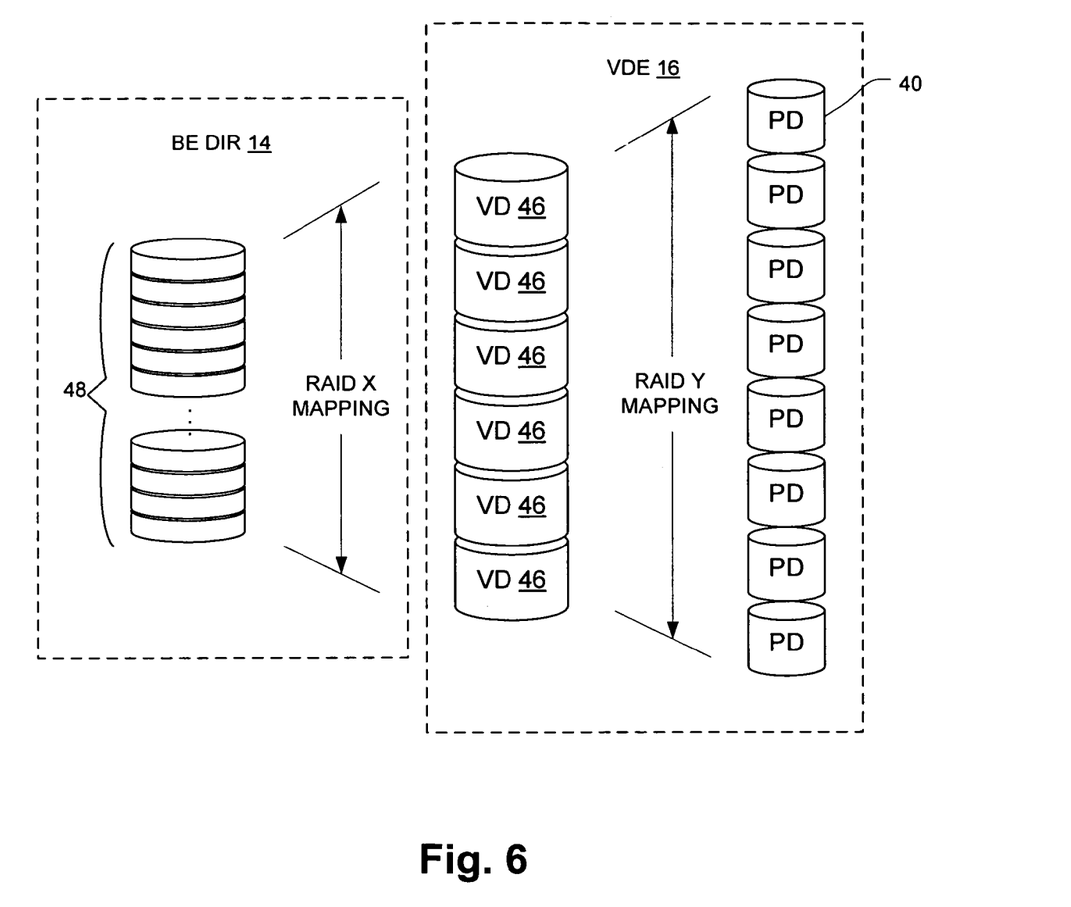

FIG. 6 illustrates a particular use of the configuration of FIG. 5 within a storage system such as that of FIG. 1. The VDs 46 presented by the VDE 16 are utilized by the BE DIR 14 to implement a second level of RAID protection. The two levels of RAID protection are shown as "RAID X" and "RAID Y" as shown. For the second level RAID X, a technique such as RAID 6+2 may be utilized, or other RAID configurations as may be desired. Thus the BE DIR 14 presents a set of logical volumes 48 to the remainder of the storage system that reside on the VDs 46 according to the RAID X scheme. It should be noted that the decisions regarding the type of data protection to be afforded at the system level (e.g., the specific nature of RAID X) are functionally independent of the presence of the RAID Y scheme within the VDEs 16. The system-level decisions are made based on the reliability/availability of the VDs 46, just as such decisions have historically been made based on the reliability/availability of physical disk drives. The benefit is that different (and potentially better) trade-offs can be made, because of the greater reliability/availability that can be achieved for each VD 46 due to the use of RAID Y within the VDE 16.

Another possibility is to configure two RAID groups as RAID 3 or RAID 6 using fourteen PDs 40, six data drives in each group and two drives of double the data drive side shared as the protection drives. This configuration has some performance restrictions but offers a cost and physical space savings.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A data storage system, comprising:
a plurality of front-end controllers for interfacing the data storage system to host computers;
a plurality of back-end controllers;

a cache and interconnect block coupled between the front-end controllers and the back-end controllers, the cache and interconnect block including (1) a cache memory for temporarily storing data blocks being transferred between the data storage system and the host computer, and (2) interconnect circuitry operative to provide interconnections among the front-end controllers, the cache memory, and the back-end controllers; and a plurality of disk enclosures coupled to the back-end controllers, each disk enclosure including:

a pair of backplanes;

a plurality of physical disk drives having respective reliability measures, each physical disk drive being redundantly connected to both of the backplanes;

a pair of power supplies, each power supply being redundantly connected to each of the backplanes; and a pair of first controllers coupled by the backplanes to the plurality of physical disk drives in a redundant fashion to enable each first controller to access any of the plurality of physical disk drives, the first controllers being operative to utilize the physical disk drives to implement a set of virtual disk drives in a first redundant-array-of-independent-disks (RAID) configuration such that each virtual disk drive has a reliability measure greater than the respective reliability measures of the physical disk drives;

wherein each back-end controller is a second controller coupled to the first controllers of a corresponding disk enclosure and operative to utilize the virtual disk drives of the corresponding disk enclosure to implement a set of storage volumes in a second RAID configuration such that each storage volume has a reliability measure greater than the respective reliability measures of the virtual disk drives of the corresponding disk enclosure.

2. A data storage system according to claim 1, wherein each disk enclosure further comprises an inter-controller bus interconnecting the pair of first controllers, and wherein each first controller is operative to mirror at least some write operations received from the back-end controller to the other first controller via the inter-controller bus.

3. A data storage system according to claim 1, wherein the first RAID configuration is effective to withstand loss of a single physical disk drive without significant performance degradation and to withstand loss of two physical disk drives without loss of user data.

4. A data storage system, comprising:

a set of disk enclosures, each disk enclosure including an enclosure, physical storage devices disposed within that enclosure, and a disk enclosure controller supported by that enclosure, the disk enclosure controller of each disk enclosure being constructed and arranged to (i) configure the physical storage devices of that disk enclosure as a disk level RAID group in which each physical storage device of that disk enclosure participates as an independent disk of the disk level RAID group, and (ii) operate as a disk enclosure interface to the physical storage devices of that disk enclosure, the disk enclosure interface presenting the disk level RAID group as a corresponding plurality of virtual disks;

a cache;

a set of front-end controllers constructed and arranged to operate as a front-end interface between a set of external host devices and the cache; and a set of back-end controllers constructed and arranged to (i) configure the virtual disks of the disk enclosures as one or more disk enclosure level redundant-array-of-independent-disks (RAID) groups in which each virtual disk of the disk enclosures participates as an independent disk of the disk enclosure level RAID group, and (ii) operate as a back-end interface between the cache and the disk enclosure level RAID group.

5. A data storage system as in claim 4 wherein the set of back-end controllers includes control circuitry which, when operating as a back-end interface between the cache and the disk enclosure level RAID group, is constructed and arranged to perform a disk enclosure data recovery operation in response to a failure of a virtual disk of the set of disk enclosures, the disk enclosure data recovery operation reconstructing data stored on the failed virtual disk from remaining virtual disks of the set of disk enclosures;

wherein the disk enclosure controller of each disk enclosure, when operating as a disk enclosure interface between the set of back-end controllers and the physical storage devices of that disk enclosure, is constructed and arranged to perform a physical storage device data recovery operation in response to a failure of a physical storage device of that disk enclosure, the physical storage device data recovery operation reconstructing data stored on the failed physical storage device of that disk enclosure from remaining physical storage devices of that disk enclosure;

and wherein physical storage device data recovery operations carried out by the disk enclosure controllers of the set of disk enclosures are performed in a separate and independent manner relative to disk enclosure data recovery operations carried out by the set of back-end controllers.

6. A data storage system as in claim 5 wherein the disk enclosure controller of each disk enclosure is one of a pair of virtual disk adapters (VDAs) of the respective disk enclosure, each VDA including:

a processor including a central processing unit and memory, the memory storing data representing the virtual disks of the disk enclosure;

a multi-port switch having respective connections to an inter-VDA bus and respective buses to the physical storage devices of the enclosure; and an interface block having connections to the processor, the multi-port switch and a respective one of the back-end controllers, the interface block providing a data path by which the respective back-end controller obtains access to the data in the memory representing the virtual disks of the disk enclosure during the disk enclosure data recovery operation.

* * * * *